United States Patent [19]

Comerio

[11] 4,408,974

[45] Oct. 11, 1983

[54] MOBILE FILM STRETCHING UNIT

[75] Inventor: Rinaldo I. Comerio, Busto A., Italy

[73] Assignee: Comerio Ercole, S.p.A., Busto A., Italy

[21] Appl. No.: 340,865

[22] Filed: Jan. 20, 1982

[51] Int. Cl.³ .......................................... A01J 21/00
[52] U.S. Cl. ..................................... 425/194; 425/66; 425/136; 425/224; 425/397; 425/445; 264/288.4
[58] Field of Search ................. 425/66, 135, 136, 384, 425/397, 403.1, 445, 62, 185, 194, 225, 363, 367, 394, 223, DIG. 53, 224; 219/10.49 A, 10.51; 264/175, 288.4; 26/71, 106; 29/115, 116 R; 165/89; 226/108, 189; 242/67.3 R, 67.2

[56] References Cited

U.S. PATENT DOCUMENTS

| | | | |
|---|---|---|---|
| 2,812,550 | 11/1957 | Chauannes | 264/288.4 |
| 2,815,531 | 12/1957 | Stewart | 425/194 |
| 3,208,100 | 9/1965 | Nash | 264/288.4 |
| 3,217,794 | 11/1965 | Meyer | 165/89 |
| 3,243,844 | 4/1966 | Nash | 425/384 |
| 3,351,697 | 11/1967 | Hufnagel | 264/288.4 |
| 3,435,648 | 4/1969 | Bergström | 425/136 |
| 3,581,340 | 6/1971 | Thieme | 425/66 |
| 3,744,106 | 7/1973 | Baum | 425/445 |
| 4,014,636 | 3/1977 | Pawekzyk | 425/224 |
| 4,261,944 | 4/1981 | Hufnagel | 264/175 |

Primary Examiner—Donald E. Czaja
Assistant Examiner—Joel S. Baden
Attorney, Agent, or Firm—Gerard F. Dunne

[57] ABSTRACT

A film stretching unit movably positioned adjacent to an existing calender installation is described which includes a plurality of stretching rollers having internal rotary joints for circulating a heating fluid therethrough. Alternate rollers are movable vertically without needing to change their rotational speed in order to easily thread the film through the stretching rollers.

12 Claims, 9 Drawing Figures

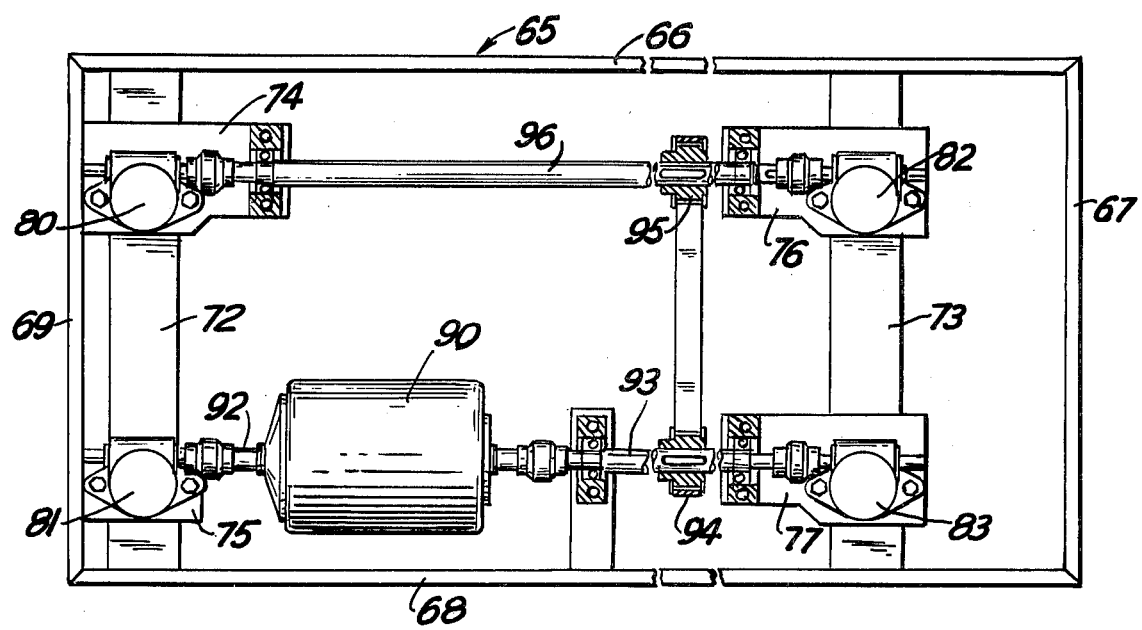
FIG. 7
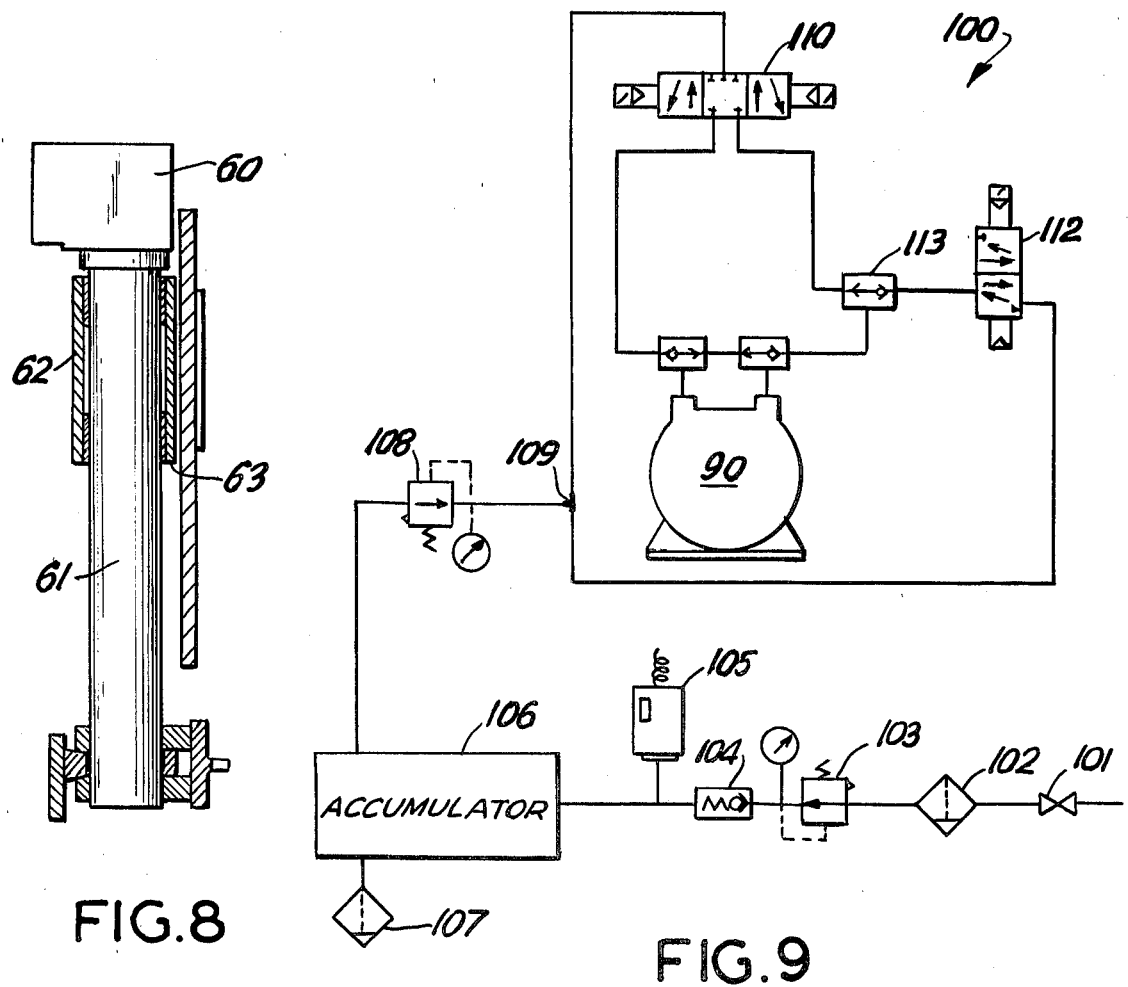
FIG. 8
FIG. 9

MOBILE FILM STRETCHING UNIT

The present invention relates to a mobile unit of stretching rollers that may be positioned closely adjacent to an existing installation of calender rolls for reducing the thickness of a heated film leaving the calender rolls.

Films or sheets of various thermoplastic polymers such as polyvinyl chloride are typically formed by passing the material through a series of heavy calender rolls sequentially reducing the thickness of the material. After passing through the calender rolls, the heated film is often stretched by passing it through a bed of stretching rollers.

In stretching the film its temperature should be sufficient to provide a melt viscosity for the polymer so its molecules can align themselves longitudinally. In this way, the film will normally not shrink appreciably upon cooling or when the film is released from tension. Additionally, such aligned films typically attain their maximum tensile and tear strength when the molecules are longitudinally aligned. Therefore, thinner and consequently less costly films can be produced with a strength comparable to thicker films whose molecules have not been longitudinally aligned.

The stretching rollers are typically heated to maintain the film in the appropriate temperature range for aligning its molecules and are often arranged close together in side-by-side relation with at least some of the rollers being rotated at speeds increasing in the downstream direction. The film leaving the calender rolls is fed between adjacent rollers and, in this way, the film leaving the calender rolls can be stretched considerably to reduce its thickness.

It is preferred that the stretching rollers be placed as close together as possible to reduce the span between rollers and thus minimize reduction in width of the film as it is drawn between adjacent rollers. Consequently, it is often difficult to thread the moving film through the bed of stretching rollers. Typically, alternate rollers are made vertically movable to enable them to be raised for allowing the film to be run between the raised rollers and the remaining lower rollers. The raised rollers can then be lowered onto the moving film. Unfortunately, however, the rotational speed of the descending rollers cannot always be controlled adequately and the descending rollers may damage or tear the moving film as they are brought into engagement with the film.

Additionally, the bed of stretching rollers should be positioned as close as practical to the last calender roll so as to reduce reduction in width of the film as it is placed under tension when stripped from the last calender roll. The calender rolls, however, are rather massive and extensive framework is often required to support the rollers with minimal deflection. In order to place the stretching rollers close to the last calender roll, the framework may also serve as the support for the initial stretching rollers, and, in this case, the framework is often drilled to receive the structures supporting the stretching rollers. Additionally, the stretching rollers are normally connected to a source of heating fluid by rotary joints which often extend outwardly along the axis of the roller. Consequently, the total length of the stretching rollers often include the actual roller surface and outwardly extending joints and connections. It is preferred that the actual roller surface of the heated rollers be equal in length to that of the calender rolls, since the length of the roller surface sets the maximum width of the film. Consequently, the framework must usually be drilled to accomodate the connections extending outwardly from the roller. Such drilling of the calender framework complicates installation and weakens the framework supporting the calender rolls. Further, it is often difficult to remove the stretching rollers or adjust their distance to the calender rolls when they are fitted within special holes formed in the calender framework. This makes maintenance as well as the initial threading of the film through the rollers difficult. Further, the holes drilled to support the stretching rollers must be spaced from the holes used to support the calender rolls in order not to unduly weaken the framework and provide adequate access to the calender rolls. This, of course, increases the spacing between the last calender roll and the initial stretching roller.

Accordingly, it is an object of the present invention to provide a bed of stretching rollers that are arranged very close together to minimize a reduction in width of the film as it is stretched and yet may be threaded easily with a moving film, and with minimal damage to the film.

It is an additional object of the present invention to provide a bed of stretching rollers that may be positioned closely adjacent to a calender roll and yet the length of each roller may be substantially equal to that of the calender rolls.

It is a further object of the present invention to provide a bed of stretching rollers whose distance to the calender roll may be adjusted easily.

A further object of the present invention is to provide a bed of stretching rollers that may be positioned easily adjacent a calender roll and removable easily therefrom for maintenance or the like.

According to the present invention, the bed of stretching rollers are provided in a take-off unit positionable adjacent the final calender roll of a calender installation processing plastic film. The stretching rollers each include means connected to alternate rollers for moving the alternate rollers vertically in unison while continually rotating the moving rollers. These means preferably include a respective gear housing connected to one end of each alternate roller and coupling a respective vertical drive shaft thereto. Each of these drive shafts slidably receives a driving shaft which is adapted to be driven by a suitable power source and is connected with the respective drive shaft for rotation therewith. Bearing housings are preferably connected to the other end of each of the alternate rollers and lift means are provided for moving the gear housings and bearing housings vertically in unison with the driving shafts continuing to rotate the drive shafts. In this way, the alternate rollers may be rotated continuously at a selected speed as the drive shafts slide over the driving shafts.

Preferably, the lift means includes a quadrilateral frame member lying below the bed of rollers and a respective shaft member connecting each housing to the frame member. Jacks are connected to corner portions of the frame member and means are also provided for actuating the jacks in unison. Preferably the jacks include respective threaded members which are all rotated in unison to raise or lower the frame member. These threaded members are preferably all rotated by a single motor which may be activated pneumatically and threaded members are engaged by a driving member which is adapted to hold the threaded members in their rotational position upon de-activation of the motor. Also, the motor may be automatically activated to raise the alternate rollers upon an electrical failure so that the rollers may be raised quickly if the driving power for rotating each roller is terminated. Also, the alternate rollers may be held in any position along their path of vertical movement so that the nip between the rollers may be adjusted quite readily.

The unit may additionally include an embossing roller located downstream of the stretching rollers and having a back-up roller preferably coated with an elastomeric or synthetic polymer and forming a nip with the embossing roller. This back-up roller may be contacted by one or more doctor rolls having a cooling medium therein to prevent the temperature of the back-up roller from rising too high.

Further, the stretching rollers are connected to the source of heating fluid through rotary joints which preferably are positioned internally within the respective rollers. In this way, the rollers can have a length approaching that of the final calender roll of the installation and yet extensive alteration of the framework for the calender rolls would not be necessary. Also, the entire unit may be positioned on a movable carriage or truck.

These and other objects, features, and advantages of the present invention will be further apparent in view of the following detailed description and accompanying drawings, in which:

FIG. 7 is a plan view of the quadrilateral frame member illustrated in FIG. 6;

FIG. 8 is a view partly in section of the structures for lifting the bearing housings connected to each stretching roller;

FIG. 9 is a diagramatic illustration of the pneumatic control circuit of the present invention.

Figure 1:
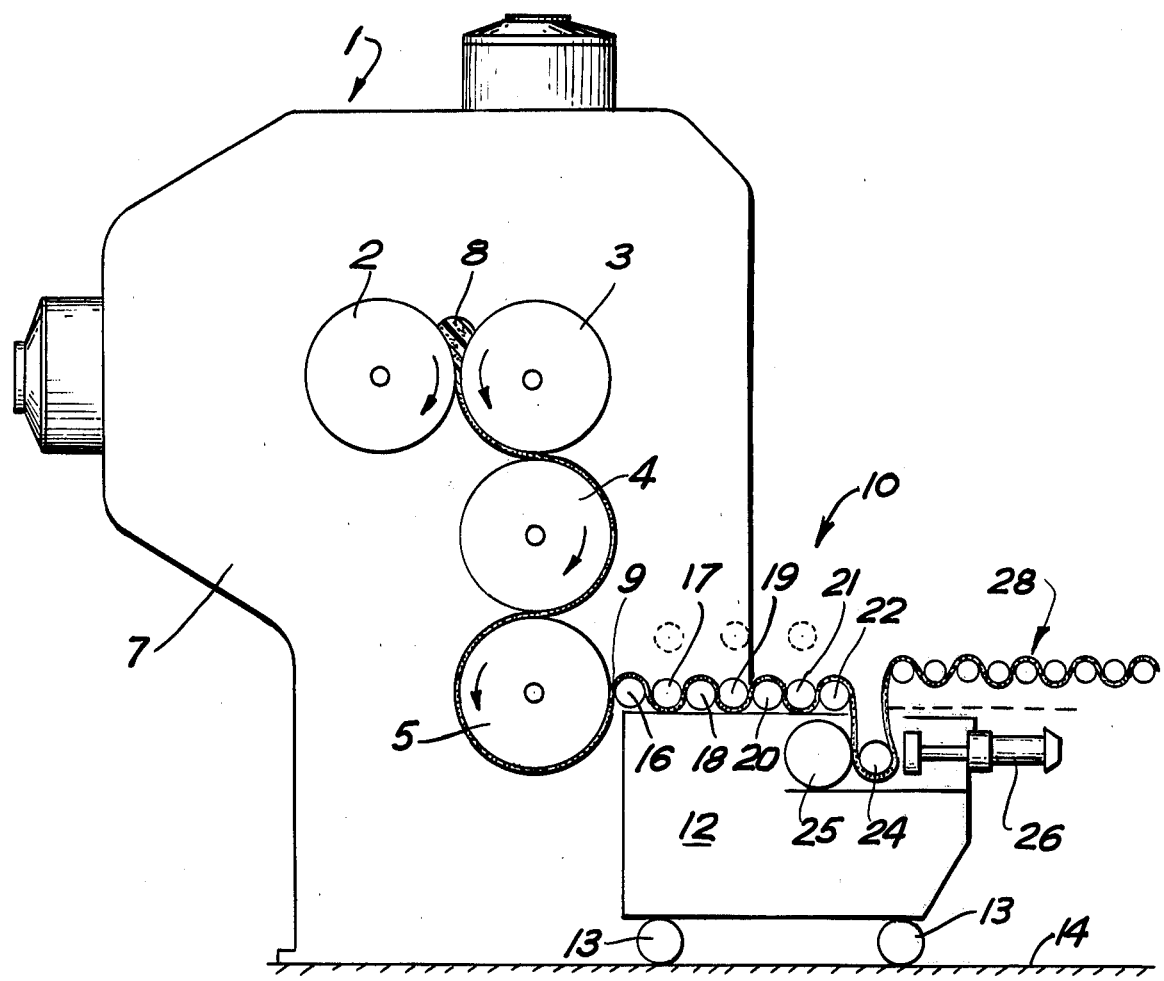
FIG. 1 is a side elevational view schematically illustrating basic elements of the present invention.
Figure 2:
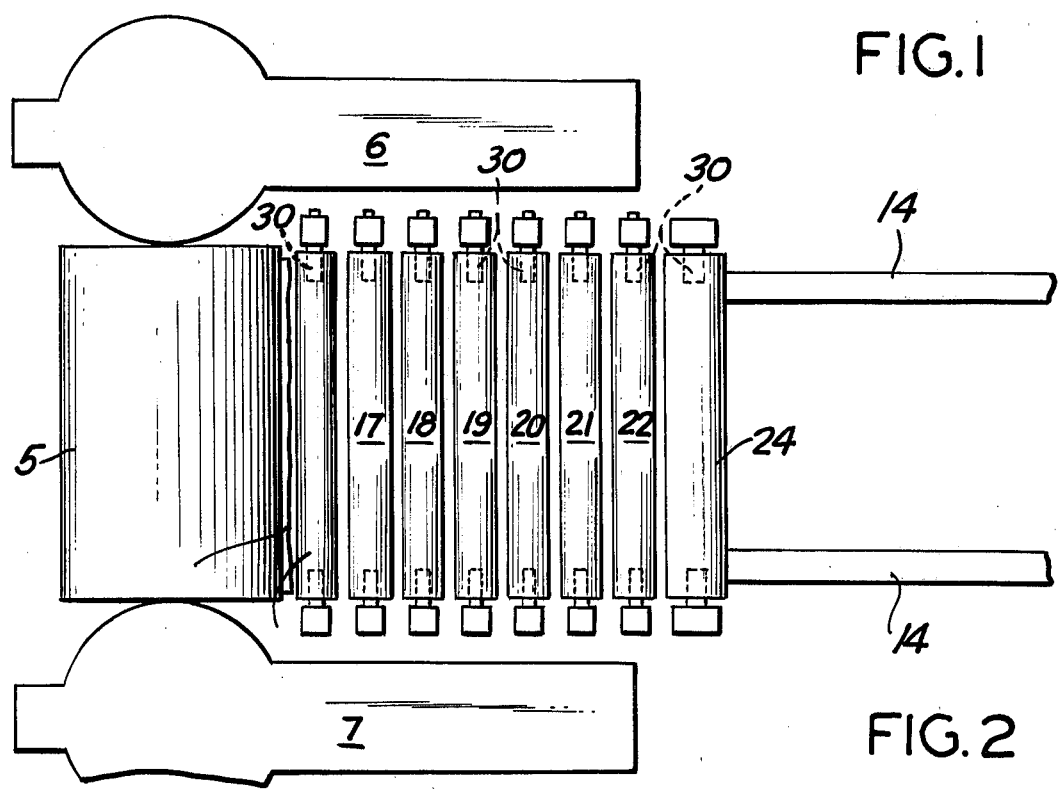
FIG. 2 is a top elevational view schematically illustrating basic elements of the present invention.

As illustrated schematically in FIGS. 1 and 2, the present invention includes a unit 10 positionable adjacent an existing calender installation 1. The calender installation 1 may take any of several forms and, as illustrated in FIG. 1, includes a plurality of rather massive calender rolls labeled 2 through 5 in FIG. 1, which are arranged in an inverted L configuration and supported rotatably by a sturdy framework including side frame members 6 and 7. A suitable plastic material 8, such as polyvinyl chloride or any other thermoplastic polymer capable of being formed into a film, is fed between the calender rolls 2 and 3, and is drawn between rolls 3 and 4 and then rolls 4 and 5 to form a thin film 9 of material around the last calender roll 5.

The thin film 9 is stripped from the last calender roll 5 and fed to the unit 10 of mobile stretching rollers. This unit 10 includes a truck 12 mounted on wheels 13 movable along rails 14 fixed to the floor of the plant containing the calender installation. The truck 12 is therefore movable along the rails 14 to position the bed of stretching rollers 16 through 22 as close as desired to the last calender roll 5, or to withdraw the entire unit 10 completely from the calender framework for maintenance or the like. By providing a mobile truck 12 for the stretching rollers, it has been found that the first roller 16 may be easily positioned anywhere from about 3 mm to about 120 mm from the last calender roll 5, as processing needs require.

The stretching rollers 16 through 22 are preferably each heated by circulating a heated fluid therein and downstream rollers are driven progressively faster. The film 9 stripped from the last calender roll 5 can be threaded in serpentine fashion between the adjacent rollers and thus can be stretched by the rotating rollers to reduce its thickness further.

In order to thread the film 9 through the bed of stretching rollers 16 through 22, alternate rollers 17, 19 and 21 are movable vertically to a raised position shown in broken lines in FIG. 1. In this way, the film 9 leaving the last calender roll 5 can be run between the raised rollers and the lower rollers 16, 18,20 and 22, whereupon the raised rollers 17, 19 and 21 can be lowered back against the film 9. As will be discussed more fully below, the rollers 17,19 and 21 can be rotated at a controlled speed continuously while being raised or lowered and, in this way, damage to the moving film 9 by the descending rollers can be reduced. Further, as will be set forth below, the rollers 17, 19 and 21 can be held anywhere within their vertical range of movement to vary the nip between adjacent rollers precisely while controlling their rotational speed. Also, the roller 17, 19 and 21 may be moved vertically without the need to alter the rotational speed of any roller. This enables the nip between rollers to be raised without undue risk of damage to the moving film 9.

In preferred form, the unit 10 additionally includes an embossing roller 24 located downstream of the last stretching roller 22. The film 9 leaving the stretching rollers is fed vertically downward between the back-up roller 25 and the embossing roller 24 urged against the back-up roller by a suitable jack 26. The embossing roller is cooled by a fluid circulated therethrough and has any of several known finishes or engravings suitable for providing the desired surface texture to the film as is well understood in the art. The film leaving the embossing roller 24 may then be led to any number of devices including, as illustrated, a mobile bed 28 of relaxing or cooling rollers.

Figure 4:
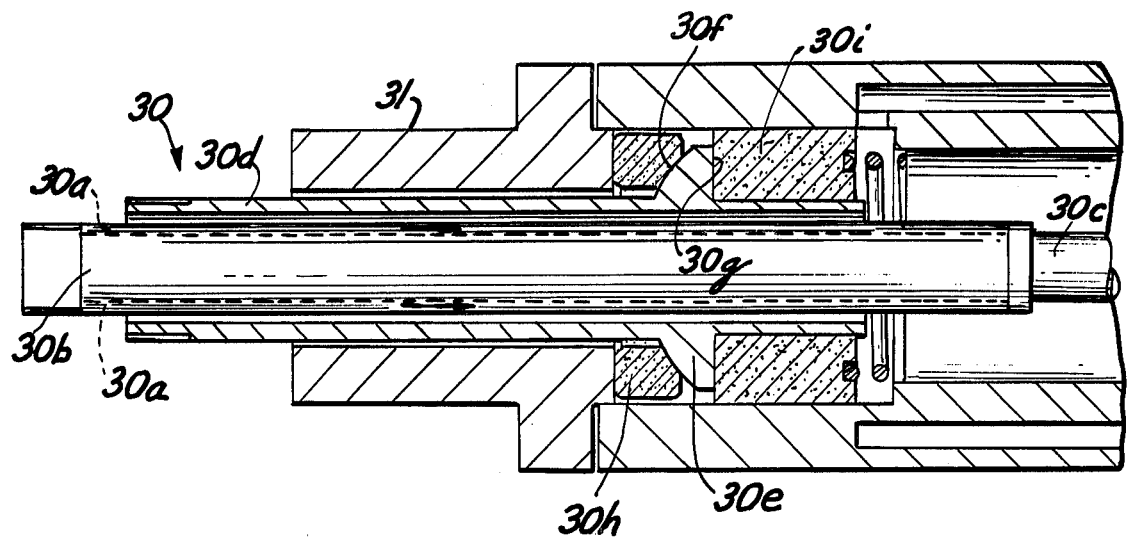
FIG. 4 is a cross-section view illustrating an internal rotary joint of the present invention.

As noted above, the stretching rollers 16 through 22 and the embossing roller 24 receive a circulating fluid therethrough. The fluid is supplied by flexible conduits entering each roller by means of a rotary joint fitted within the respective roller. These internal rotary joints 30, shown diagramatically in FIG. 2 and in section in FIG. 4, are fitted internally of the respective roller. These rotary joints enable the fluid conduits to be coupled to the respective rollers without significantly increasing the axial length of the roller. By these arrangements, the stretching rollers and embossing roller may have a length approaching that of the existing calender rolls and yet the side frame members 6 and 7 of the calender installation 1 need not be drilled or otherwise cut-away to accomodate the axially extending rotary joints and fluid conduits typically used with heated rollers. The framework supporting the calender rolls thus need not be weakended and the mobile unit 10 can be moved easily between the side frame members 6 and 7 to enable the unit to be withdrawn for maintenance, or to ease the initial feeding of the film 9 through the stretching rollers. Additionally, the spacing of the unit 10 from the last calender roll 5 can be adjusted readily to bring the first stretching roller 16 closer to the calender roll 5 if necessary for particular processing requirements, such as to reduce draw-down shrinkage in width of the film as it leaves the last calender roll.

As illustrated in FIG. 4, each stretching roller includes fluid conduits 30a for delivering the heated fluid to the roller, and concentric conduit 30b receiving the exiting fluid from axial pipe 30c. Fitted to the outer conduit 30a is a collar member 30d having an annular head portion 30e. This head portion 30e includes a convex bearing surface 30f and a planar bearing surface 30g. A seal member 30h formed of a carbon-graphite material is held to hub portion 31 of the roller and rotates against convex bearing surface 30f. Similarly, guide member 30i also formed of a carbon-graphite material is held to the inside surface of the roller and rotates against planar bearing surface 30g. In this way, the rotary joint 30 is essentially within the roller.

Figure 3:
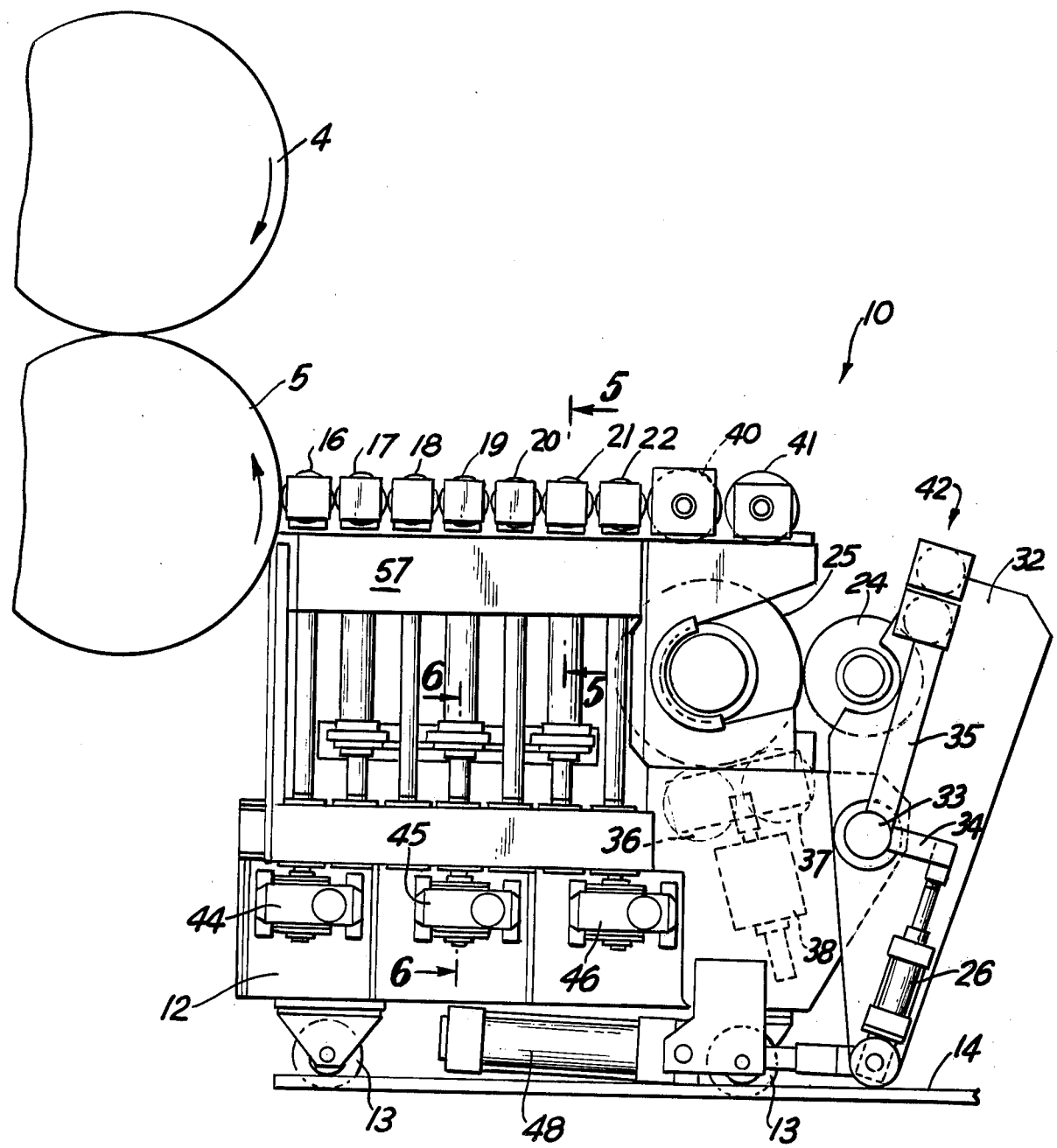
FIG. 3 is a side elevational view of one form of the present invention.

FIGS. 1 and 2 described above illustrate the present invention schematically to assist overall understanding of important features of the present invention. One operative form of the present invention is illustrated in FIG. 3 wherein reference numerals similar to those used in FIGS. 1 and 2 are used to designate comparable elements. As shown in FIG. 3, the mobile unit 10 includes the seven stretching rollers 16 through 22 and the embossing roller 24 with its associated back-up roller 25. The embossing roller 24 is held to a bracket member 32 pivotally connected to the truck 12 at connection 33. Jack 48 is connected to the exterior of the truck 12 and is adapted to rotate the bracket member 32 inwardly with appropriate force to maintain the embossing roller 24 in proper pressure engagement with its back-up roller 25. The embossing roller 24 is held removably by the bracket member 32 to enable the embossing roller 24 to be exchanged for another providing different surface characteristics to the processed film. Since the bracket member 32 is pivotally connected to the truck 12, the jack 48 can be used to reposition the bracket member 32 to compensate for an embossing roller of a diameter different from that of roller 24.

The back-up roller may be provided with a cooling fluid through a flexible conduit and a rotary joint so as to withdraw excess heat accumulated from its contact with the heated film to prevent damage to its covering. The back-up roller may be further cooled by its contact with cooling doctor rollers 36 and 37 which each similarly receive a cooling fluid by means of a flexible conduit and a rotary joint. The cooling rollers 36 and 37 are urged into engagement with the back-up roller by the pneumatic jack 38. In preferred form, the back-up roller 25 has an elastomeric, heat resistant coating, such as a coating of Hypalon, neoprene, Norel or a silicone rubber, to increase its useful life. The coating is selected to have a suitable Shore A durometer hardness to permit the engraved embossing roller 24 to indent the film into the back-up roller so as to set the pattern formed upon the film.

As can be noted from FIG. 3, the back-up roller 25 is rather large and my approach 260 mm in diameter. Consequently, additional rollers 40 and 41 are provided to transport the film 9 horizontally to a position vertically above the nip formed between the embossing roller 24 and its back-up roller 25. In this way, the film 9 can be fed automatically into the embossing nip by allowing it to fall from the roller 41. The film can then be brought around the embossing roller 24 and passed on to a subsequent processing station by pick-off roller pair 42. In order to enable the film to be led around the embossing roller, the pick-off roller pair 42 is movable away from the embossing roller by jack 26 pivoting the lever 34 connected to lever 35 at connection 33. Lever 35 is connected to the pick-off roller pair 42 to enable its position to be controlled by jack 26.

Figure 6:
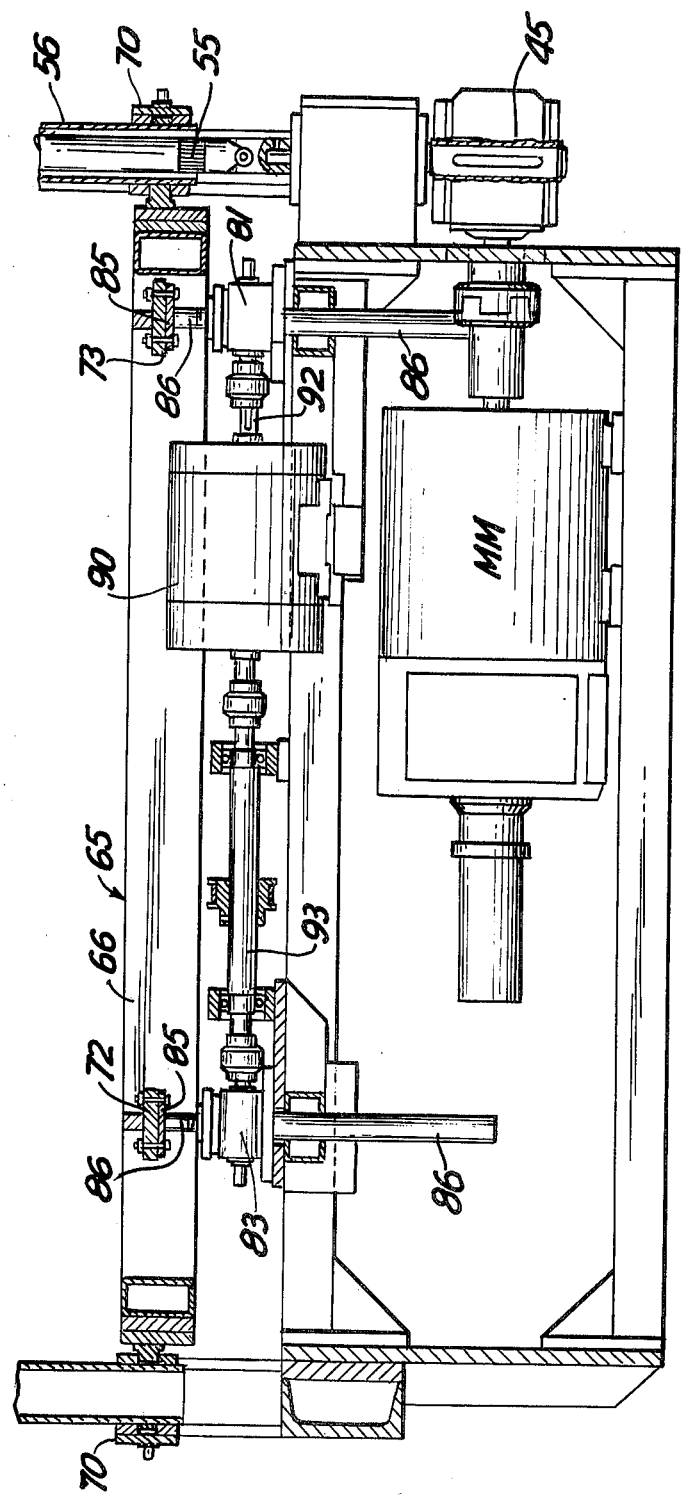
FIG. 6 is a cross-sectional view taken along line 6—6 of FIG. 3.

The stretching rollers 16 through 22 are rotated at variable speeds increasing in the downstream direction and these speeds are syncronized with the rotational speed of the calender rolls and other processing equipment downstream of the unit 10. In preferred form, three separate direct current electric motors are mounted within the truck 12, and one of these motors MM is illustrated in the section of FIG. 6. The three motors are connected to the respective stretching rollers by suitable reduction gearing units illustrated as units 44, 45 and 46 of FIG. 3. One of the motors is connected to rollers 16 and 17 by reduction unit 44 so as to rotate these rollers at the same speed; while a second motor is connected to rollers 18 and 19 through reduction unit 45 so as to rotate roller 18 at the same speed as roller 19. The speed of roller 18 and 19 may be about 5% faster than the speed of rollers 16 and 17. Additionally, rollers 20, 21 and 22 are each driven by a motor connected to reduction unit 46 to drive these rollers at the same speed which, typically, may be about 5% faster than the speed of rollers 18 and 19. By this arrangement, it has been found that the stretching rollers 16 through 22 can stretch the film leaving the calender rolls more than 300% if desired. Additional electric motors, not shown, are also provided for rotating the rollers 40 and 41 as well as the embossing roller 24. Additionally, a motor or screw type reduction unit, not shown, is provided for moving the truck along the rails 14. Preferably, this unit is controlled by limit switches and stops adjacent the calender roll 5 to prevent the truck from contacting this last calender roll.

Figure 5:
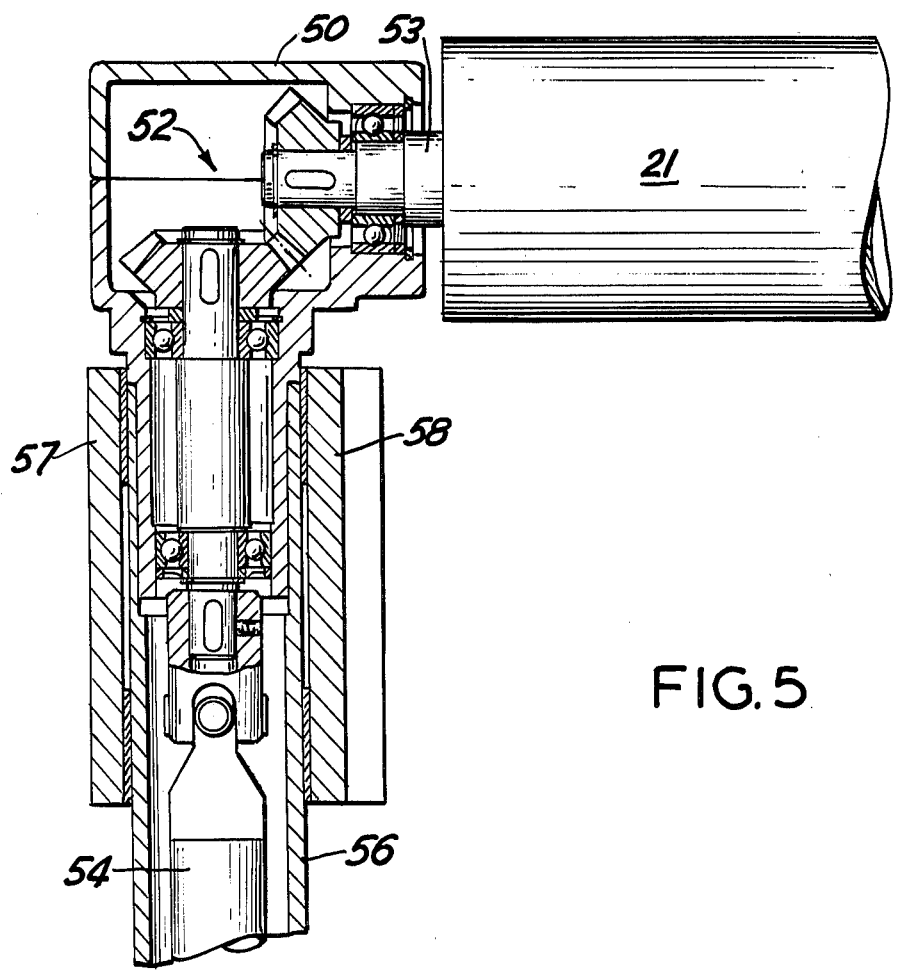
FIG. 5 is a cross-sectional view taken along line 5—5 of FIG. 3.

The mechanism for moving the alternate stretching rollers, 17, 19 and 21 vertically in unison are illustrated in the sectional views of FIGS. 5 and 6. As shown in FIG. 5, one end of each of these alternate rollers is connected to a respective gear housing 50. A bevel gear arrangement 52 is held within the respective gear housing and couples the axial hub 53 of the roller with the vertical drive shaft 54. The drive shafts 54 extend downwardly and receive slidably driving shafts 55 connected to the respective electric motors through the reduction units. The driving shafts 55 extend upwardly within the vertical drive shafts 54 and are splined for rotation therewith. In this way, the drive shafts 54 can be rotated continuously by the rotating driving shafts 55 as they slide thereover.

As shown in FIGS. 5 and 6, the vertical drive shafts 54 extend within tubular shaft members 56 held slidably between facing support members 57 and 58. The gear housings 50 are seated upon the respective shaft members 56 and, consequently, are raised or lowered by vertical movement of the shaft members 56.

The other ends of the alternate rollers 17, 19 and 21 are connected to respective bearing housings 60, as illustrated in FIG. 8. These bearing housings contain bearings rotatably supporting the respective roller and are seated on shaft members 61 slidable within facing support members 62 and 63.

As shown most clearly in FIGS. 6 and 7, a quadrilateral frame member 65 is positioned below the bed of stretching rollers and is formed of tubular frame elements 66, 67, 68 and 69 arranged coplanar horizontally. The six movable shaft members 56 and 61 of the alternate rollers are held securely to the quadrilateral frame member 65 by clamp members 70. By these arrangements, the alternate rollers 17, 19 and 21 can be raised or lowered in unison by raising or lowering the quadrilateral frame member 65 while maintaining its horizontal orientation.

In order to move the quadrilateral frame member 65 vertically, two elongate pads 72 and 73 are provided interiorly of the frame member 65 and held securely thereto by bracket elements 74, 75 and 76, 77 respectively. These pads extend parallel in spaced relation and four jacks 80, 81, 82 and 83 are positioned below respective ends of the pads, as shown clearly in FIGS. 6 and 7. The heads 85 of the respective jacks are bolted to the respective pads and are driven vertically by respective threaded members 86.

The threaded members may be moved vertically by suitable rack-and-pinion arrangements, but preferably the jacks each include a worm gear arrangement which is self-locking so as to hold the raised rollers in any desired position. As shown in FIG. 7, the threaded members are preferably driven by a single motor 90 mounted within a quadrilateral frame member 65. The motor 90 may be driven in either rotational direction and is connected directly to shafts 92 and 93 connected to the jacks 81 and 83, respectively. A timing pulley 94 is connected to shaft 93 and a timing belt is trained around this timing pulley 94 and a second timing pulley 95 is connected to shaft 96. Shaft 96 is coupled to jacks 80 and 82 and, consequently, all four jacks are actuated in unison by motor 90.

Motor 90 may be a bi-directional electric motor, but preferably, the motor 90 is activated pneumatically. In this way, the motor can be activated despite an electrical failure to raise the rollers and reduce any damage to the film strip. Preferably, the rollers are raised automatically in the event of an electrical failure and a suitable pneumatic control circuit 100 is illustrated in FIG. 9.

The pneumatic fluid is supplied to the control circuit 100 through cock 101 and filter 102. A valve 103 is supplied for adjusting pressure of the line and the line pressure is passed through one-way valve 104 and pressure switch 105. An accumulator tank 106 having automatic discharge valve 107 for pressure relief applies the fluid pressure through the pressure regulating valve 108 to line branch 109.

Valve 110 is activated by a solenoid or the like to apply fluid pressure to motor 90 in either direction to either raise or lower the rollers, as desired. Valve 112 is controlled by a solenoid or the like and is noramlly held closed. Upon an electrical failure, however, the solenoid is de-energized to open the valve 112 and feed the pressure accumulated in tank 106 to the motor 90 through quick discharge valve 113 to rapidly raise the alternate rollers.

The fundamental features of the present invention have been set forth above in conjunction with a preferred embodiment. The important features of the present invention, however, may take any of several forms, all intended to be encompassed within the scope of the appended claims.

What is claimed is:

1. In a take-off unit positionable adjacent to the final calender roll of a calender installation for processing plastic film and including a bed of stretching rollers for applying stretching forces to said plastic film, the improvement comprising means connected to alternate rollers of said bed of rollers for moving said alternate rollers vertically in unison while continuously rotating the moving rollers.

2. A unit according to claim 1, wherein said means includes respective gear housings connected to one end of each said alternate roller and coupling a respective vertical drive shaft thereto, said drive shafts each slidably receiving a driving shaft adapted to be driven by a suitable power source and connected for rotation with the respective drive shaft, bearing housings connected to the other end of each said alternate roller, and lift means for moving said gear housing and said bearing housing vertically in unison with said drive shafts continuing to rotate said driving shafts and thereby said alternate rollers as said driving shafts slide over said drive shafts.

3. A unit according to claim 2, wherein said lift means include a quadrilateral frame member lying below said bed of rollers, a respective shaft member connecting each said housing to said frame member, a plurality of jacks connected to corner portions of said frame member, and means for actuating said jacks in unison.

4. A unit according to claim 3, wherein said jacks each comprise a respective threaded member rotated in unison to raise or lower said frame member by a single motor.

5. A unit according to claim 4, wherein said threaded member is engaged by a driving member adapted to hold said threaded member in its rotational position upon de-activation of said motor.

6. A unit according to claim 4, wherein said means are activated pneumatically.

7. A unit according to claim 6, including means for automatically activating said motor to raise said alternate rollers upon an electrical failure.

8. A unit according to claim 1, wherein said means are adapted to hold said alternate rollers in any position along their path of vertical movement.

9. A unit according to claim 1, further including an embossing roller located downstream of said bed of stretching rollers and a back-up roller forming a nip with said embossing roller.

10. A unit according to claim 9, wherein said back-up roller is contacted by at least one doctor roll having a cooling medium therein.

11. A unit according to claim 1, wherein said stretching rollers are connected to a source of heating fluid through rotary joints positioned internally within the respective rollers whereby said rollers can have a width approaching that of the final calender roll of said installation.

12. A unit according to any of claims 1, 9, or 11, further including a mobile carriage supporting said unit.

* * * * *